June 7, 1932.   E. J. HAWKS   1,862,347
MATERIAL SPREADER
Filed Nov. 5, 1928

INVENTOR.
Estus J. Hawks
BY
ATTORNEYS.

Patented June 7, 1932

1,862,347

UNITED STATES PATENT OFFICE

ESTUS J. HAWKS, OF CEDAR RAPIDS, IOWA

MATERIAL SPREADER

Application filed November 5, 1928. Serial No. 317,138.

This invention is particularly designed for spreading prepared fertilizer on lawns and the invention is exemplified as a spreader particularly made for this purpose. It is desirable in the fertilizing of lawns to apply evenly and at comparatively frequent intervals small quantities of fertilizer. As the average lawn is care for the handling of the fertilizer is a disagreeable feature of such application. The present invention makes it possible to deliver the fertilizer from a bag directly to the spreader without in any way coming in contact with the fertilizer. It is, of course, very desirable in the application of fertilizer that it be evenly spread over the lawn. In this way a more concentrated fertilizer may be used without danger of injury to the lawn. Features and details of the invention will appear from the specification and claims.

A preferred embodiment of the invention is illustrated in the accompanying drawing as follows:—

Figure 1:
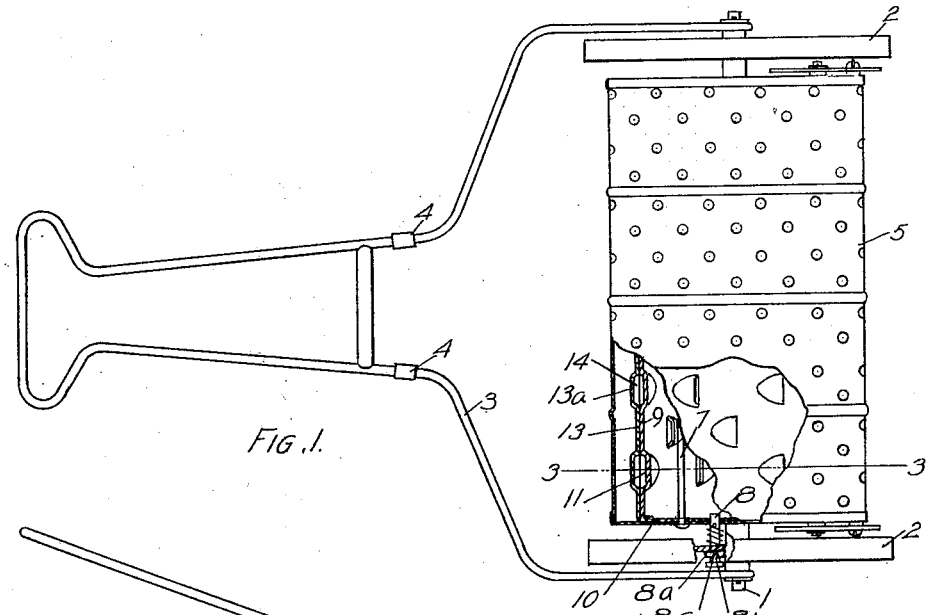
Fig. 1 shows a plan view of the spreader, partly in section, on the line 1—1 in Fig. 2.
Figure 2:
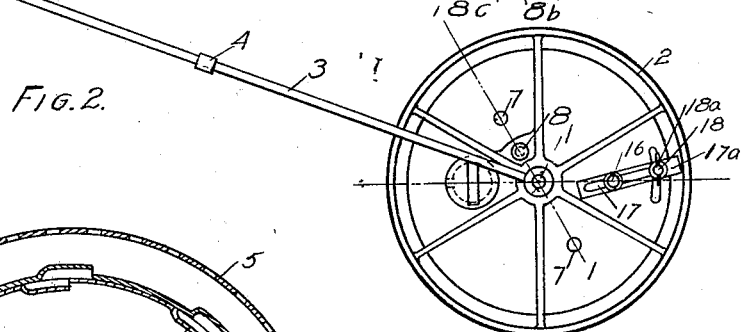
Fig. 2 is a side elevation of the same.
Figure 3:
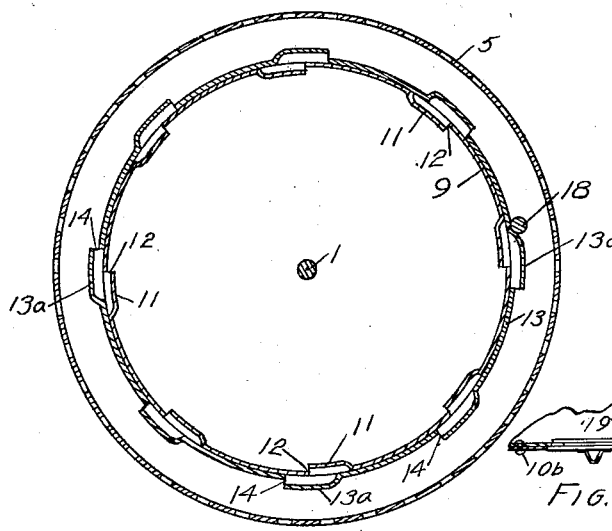

Fig. 3 an enlarged section on the line 3—3 in Fig. 1.

Figure 4:
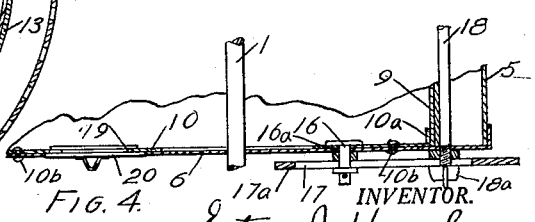

Fig. 4 an enlarged sectional view showing the assembling of the drums.

1 marks the axle, 2 wheels mounted on the axle, and 3 a forked handle secured to the axle, the forked handle being preferably separable at 4 to facilitate shipping.

A perforated guard drum 5 having the end walls 6 is mounted on the axle. These end walls are clamped against the drum cylinder 5 by rods 7 which extends entirely through the drum. A spring actuated catch bolt 8 is carried by the wheel and extends into the perforation in the end wall of the drum locking the drum with the wheel. This bolt extends through a sleeve 8a in the wheel which has an axial slot 8b. A pin 8c extends through the bolt and when the bolt is turned so that the pin is in the slot 8b the bolt will catch into the perforation in the end wall but when the bolt is retracted and turned so that the pin 8c engages the end of the sleeve 8a the bolt is retracted and the wheels can rotate without rotating the drum.

A feed drum 9 is within the outer, or guard drum 5. The cylindrical walls of this drum are arranged on an inturned flange 10a of an end plate 10. The end plate is secured by rivets 10b on the end plate 6. The wall of the feed drum has inwardly extending lips 11 which are struck up in the plate forming tangentially faced openings 12. A regulating cylinder 13 is movably mounted on the feed drum 9. It has outwardly extending lips 13a struck up in its walls forming tangentially faced openings 14. The lips 13a and 11 may be placed directly in register and form feed pockets between them the connection between the pockets formed by the lips being in effect a throat 15 and this throat may be extended, or contracted, by rotating the shell 13 on the feed drum. In this way the feed is controlled. Pins 16 extend from the ends of the cylinder 13 through slots 16a in the ends of the drum. These pins extend through slots 17 in a plate 17a. A pin 18 extends from the end of the drum through the slot 17 and a thumb nut 18a is arranged on the screw 18 and is adapted to clamp the plate 17a in place and consequently clamp the regulating cylinder 13 in adjustment.

An opening 19 extends through the end wall and is provided with a removable cover 20. To fill the drum with fertilizer it is turned up on end. The cover is removed from the opening 19, the bag of fertilizer untied and its end extended through the opening. It is possible then to empty the fertilizer from the bag into the spreader without in any way coming in contact with the fertilizer.

In operation as the wheels are rotated, the drums are rotated. The openings 12 of the pockets as they move upwardly pick up a measured quantity of fertilizer and this fertilizer as the pocket reverses passes through the throat and some of it into the space between the feed and guard drums and the rotation of the guard drum works the fertilizer through the perforations of the guard drum so that it may be deposited evenly and in measured quantities as the spreader is moved over the surface.

What I claim as new is:—

1. In a material spreader, the combination of a feed drum having tangentially faced openings through the shell thereof; a portable rotative mounting for the drum; and means adjusting the feed openings comprising a cylinder carried by the drum and having tangentially faced openings registering with the openings in the wall of the drum, said cylinder being movable relatively to the drum to vary the openings.

2. In a material spreader, the combination of a feed drum having feed openings through the shell thereof, said openings facing in a direction at an angle to a radial line leading from the axis of the drum; a portable rotative mounting for the drum; means adjusting the feed openings comprising a cylinder carried by the drum and having openings registering with the openings in the wall of the drum, said cylinder being movable on the drum to vary the openings; and a guard drum surrounding the feed drum and having its walls perforated and spaced from the walls of the feed drum.

3. In a material spreader, the combination of a feed drum having openings through the shell thereof; a portable rotative mounting for the drum; means for adjusting the feed openings comprising a cylinder carried by the feed drum and having openings registering with the openings in the wall of the drum, the cylinder being movable relatively to the drum to vary the openings; a guard drum surrounding the feed drum and having its walls perforated and spaced from the walls of the feed drum; pins extending from the cylinder through the ends of the drums; and means for locking the pins in adjustment.

4. In a material spreader, the combination of a feed drum having feed openings through the shell thereof; a portable rotative mounting for the drum; a guard drum surrounding the feed drum and having its walls perforated and spaced from the walls of the feed drum; and means for adjusting the openings in the feed drum, said means having an operable member without the drums.

5. In a material spreader, the combination of a feed drum having feed openings through the shell thereof; a portable rotative mounting for the drum; a guard drum surrounding the feed drum and having its walls perforated and spaced from the walls of the feed drum; and means for adjusting the openings in the feed drum, said means having an operable member at the end of and without the drums.

6. In a material spreader, the combination of a feed drum having feed openings through the shell thereof; a portable rotative mounting for the drum; means adjusting the feed openings comprising a cylinder carried by the drum and having openings registering with the openings in the wall of the drum, said cylinder being movable on the drum to vary the openings; a guard drum surrounding the feed drum and having its walls perforated and spaced from the walls of the feed drum; and means for adjusting the cylinder, said means having an operable member extending to without the drum.

In testimony whereof I have hereunto set my hand.

ESTUS J. HAWKS.